United States Patent
Nardick

[19]

[11] Patent Number: 5,950,988
[45] Date of Patent: Sep. 14, 1999

[54] CONCRETE BOOM DISCHARGE VALVE APPARATUS

[76] Inventor: Joseph L. Nardick, 1834 St. Margarets Rd., Annapolis, Md. 21401

[21] Appl. No.: 08/889,546
[22] Filed: Jul. 8, 1997
[51] Int. Cl.⁶ ........................................................ F16K 1/16
[52] U.S. Cl. ............................................. 251/303; 251/299
[58] Field of Search ..................................... 251/298, 299, 251/303

[56] References Cited

U.S. PATENT DOCUMENTS

| | | | |
|---|---|---|---|
| 3,315,585 | 4/1967 | Hawkins et al. | 251/299 X |
| 3,520,333 | 7/1970 | De Young, Jr. et al. | 138/92 |
| 3,552,440 | 1/1971 | Smith | 137/625.47 |
| 3,556,116 | 1/1971 | Allen | 137/1 |
| 4,437,646 | 3/1984 | Bigelow et al. | 251/145 |
| 4,690,296 | 9/1987 | Elliott | 251/299 X |
| 4,832,078 | 5/1989 | Szekely | 251/303 X |
| 4,899,979 | 2/1990 | Stamp | 251/299 X |
| 4,913,398 | 4/1990 | Ziaylek, Jr. et al. | 251/298 X |
| 4,969,586 | 11/1990 | Ostroski | 251/299 X |
| 5,056,678 | 10/1991 | Grills et al. | 251/299 X |
| 5,209,409 | 5/1993 | Neiss | 251/299 X |
| 5,810,327 | 9/1998 | Lutz | 251/303 X |

Primary Examiner—John Rivell
Assistant Examiner—Meredith H. Schoenfeld
Attorney, Agent, or Firm—Henderson & Sturm

[57] ABSTRACT

A concrete boom discharge valve apparatus 10 for controlling the flow of concrete from the discharge end 101 of a concrete boom 100 including a nozzle member 20 operatively connected on one end 21 to the discharge end 101 of the boom 100 and having the other end 24 of the nozzle member 20 defining a contoured valve seat 25 which is operatively associated with a spring biased gate face element 31 of a gate valve member 30 for controlling the flow through the nozzle member 20.

4 Claims, 2 Drawing Sheets

CONCRETE BOOM DISCHARGE VALVE APPARATUS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of concrete boom valve apparatus in general, and in particular to an add-on valve apparatus installed on the terminal discharge end of a conventional concrete boom.

2. Description of Related Art

As can be seen by reference to the following U.S. Pat. Nos. 3,520,333; 3,552,440; 3,556,116; and 4,437,646, the prior art is replete with myriad and diverse concrete discharge pipe valve arrangements. While all of the aforementioned prior art constructions are more than adequate for their intended purpose and function, only the Allen '116 patent provides a means for terminating the flow of concrete at the very mouth of the discharge pipe.

As anyone in the construction trade is all too well aware, there is a tremendous amount of waste and damage resulting from excess volumes of concrete falling from the discharge end of a concrete boom in the normal course of operation.

As a consequence of the foregoing situation, there has existed a longstanding need in the building trades for a new type of concrete boom discharge valve that will positively terminate the flow of concrete at the discharge end of the concrete boom hose, as opposed to having to dump a quantity of the excess concrete within the boom hose at the work site.

The conventional dumping of the excess concrete at the work site poses a potential threat to cars, buildings, roadways, equipment, finished work and construction workers and may result in loss of time, property damage, personal injury and additional labor cost associated with the effort spent in cleaning up the excess discharge.

Obviously, the provision of a new type of concrete boom discharge valve apparatus which will address all of the problems of the majority of the prior art constructions is a stated objective of the present invention.

BRIEF SUMMARY OF THE INVENTION

Briefly stated, the concrete boom discharge valve apparatus that forms the basis of the present invention comprises in general, a nozzle unit which is operatively connected on one end to the discharge end of a concrete boom. The other end of the nozzle unit is provided with a gate valve unit.

As will be explained in greater detail further on in the specification, the nozzle unit comprises an elongated hollow cylindrical nozzle member having a contoured inboard end which is dimensioned to receive a conventional coupling ring for operatively connecting the inboard end of the nozzle member to the discharge end of a conventional concrete boom.

In addition, the intermediate portion of the nozzle member is provided with a pair of handle elements which not only allow the nozzle member to be selectively positioned at a job site, but which also provide a pivot bearing surface for the gate valve unit.

The gate valve unit is operatively associated with both the intermediate portion and the outboard end of the nozzle member and comprises a spring biased gate valve member which is pivotally suspended from the nozzle handle elements and provided with a valve face element that positively engages the outboard discharge end of the nozzle member in a spring biased fashion.

In addition, the gate valve member is further provided with an actuating handle lever to overcome the gate valve spring biasing element to force the gate valve member into a spring biased closed position. A stop element on the gate valve member will limit the movement of the valve face element relative to the discharge end of the nozzle member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
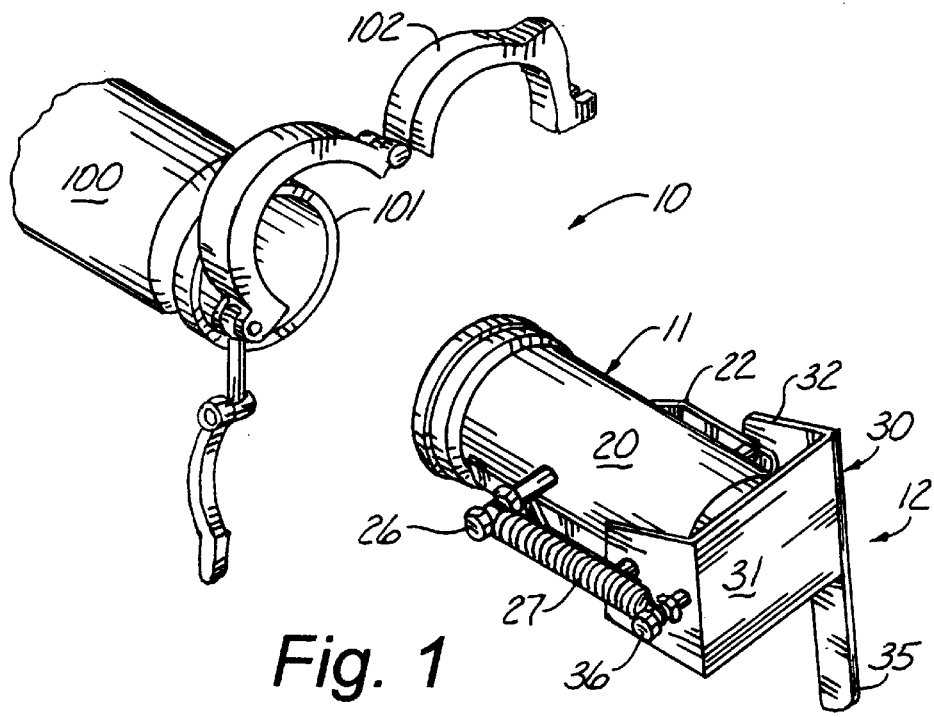
FIG. 1 is an exploded perspective view of the discharge valve apparatus and associated hardware.
Figure 2:
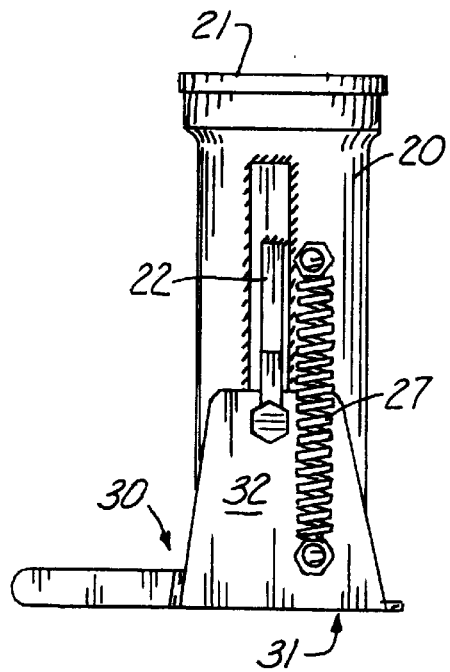
FIG. 2 is a side elevation view showing the valve member in the closed position.

As can be seen by reference to the drawings, and in particularly to FIG. 1, the concrete boom discharge apparatus that forms the basis of the present invention is designated generally by the reference number 10. The discharge apparatus 10 comprises in general, a discharge nozzle unit 11, and a gate valve unit 12. These units will now be described in seriatim fashion.

As shown in FIGS. 1 through 4, the discharge nozzle unit 11 comprises an elongated hollow cylindrical nozzle member 20 having a contoured inboard end 21 which is dimensioned to receive a coupling connector 102 for operatively connecting the inboard end 21 of the nozzle member 20 to the discharge end 101 of a conventional concrete boom 100.

In addition, the intermediate portion of the nozzle member 20 is provided with a pair of opposed handle elements 22 which are employed to maneuver the nozzle member 20 when it is operatively connected to the discharge end 101 of the concrete boom 100.

Figure 4:
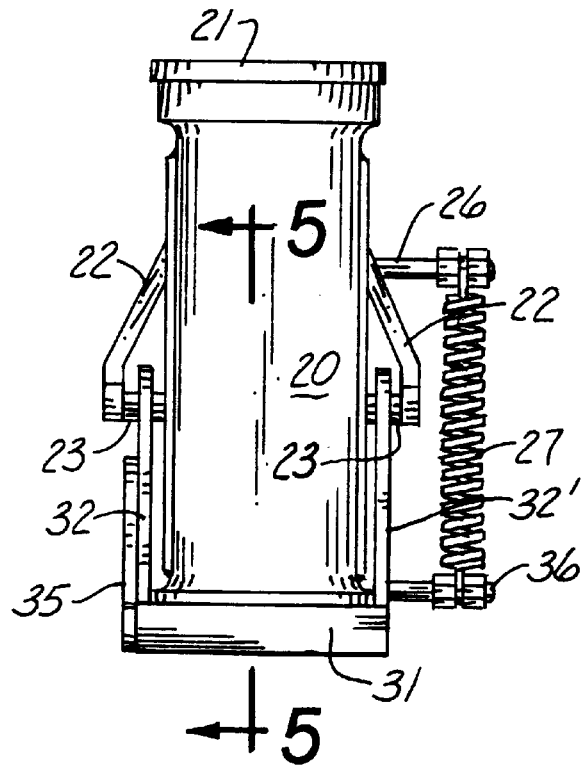
FIG. 4 is a front elevation view of the discharge valve apparatus.

As can also be seen by reference to FIG. 4, the lower portion of the handle elements 22 are diametrically opposed from one another and form a pivot bearing surface 23 and the contoured outboard end 24 of the nozzle member 20 includes a contoured valve seat 25. The purpose and function of the pivot bearing surfaces 23 and valve seat 25 will be explained presently.

As shown in FIGS. 1 through 4, the gate valve unit 12 comprises a gate valve member 30 including a gate face element 31 dimensioned to cover the contoured valve seat member 25 and suspended from a pair of valve arm elements 32, 32' which are pivotally connected to the bearing surfaces 23 on the opposed handle elements 23 of the nozzle member 20 in a well recognized fashion.

Figure 5:
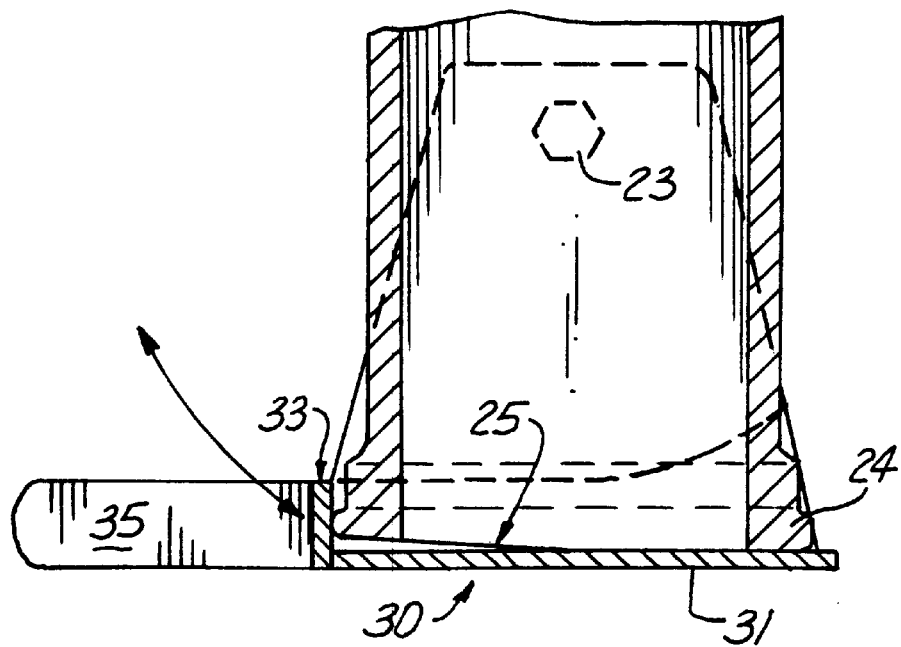
FIG. 5 is a cross-sectional view taken through line 5—5 of FIG. 4.

In addition, as shown in FIG. 5, the rear surface of the gate face element 31 is provided with a stop member 33 dimensioned to limit the travel of the gate face element 31 relative to the valve seat 25. One of the arm elements 32 of the gate face element 31 is also provided with an elongated outwardly projecting actuator lever 35 which is employed to pivot the gate valve member 30 into and out of engagement with the valve seat member 25.

As can best be seen by reference to FIG. 4, the gate valve member 30 is provided with a post element 36 which projects outwardly from the other pivoted valve arm elements 32'. In addition, a complementary post element 26 projects outwardly from the upper end of the nozzle member 20 and a spring biasing member 27 is operatively suspended form the nozzle and gate valve post elements 26, 36 for biasing the gate valve member 30 in an open position relative to the nozzle member 20.

Figure 3:
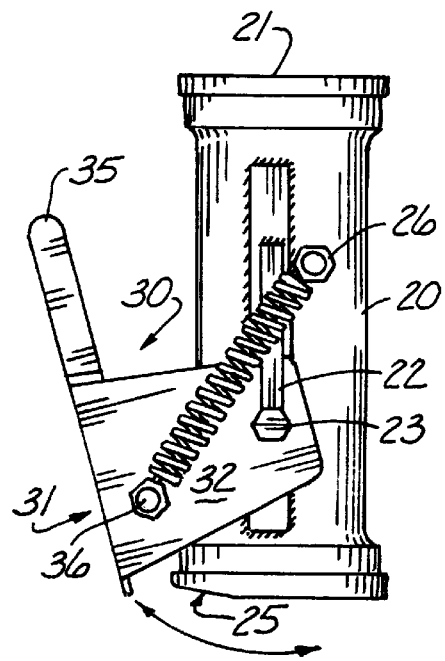
FIG. 3 is a side elevation view showing the valve member in the open position.

During the normal operation of the concrete boom 100, the discharge apparatus 10 would be deployed in the open position depicted in FIG. 3. Then when it is desired to terminate the flow of concrete through the discharge end concrete boom 100 at essentially the terminus of the concrete boom 100, one of the workers would grasp the actuator lever 35 pulling it downwardly against the resistance of the spring member 27 until the gate face element 31 was seated against the nozzle member valve seat 25. In this position, the spring member 27 is deployed in an over-center position, which will resist the accidental dislodgement of the gate face element 31 from the valve seat 25, until such time as the actuator lever 35 is employed to open the gate valve member 30.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A concrete boom discharge valve apparatus for controlling the flow of concrete from the discharge end of a concrete boom wherein the discharge apparatus comprises:

an elongated hollow nozzle member having an inboard end operatively connected to the discharge end of the concrete boom, an outboard end defining a valve seat, and an intermediate portion;

a gate valve member provided with a pair of support arm elements pivotally disposed on the intermediate portion of the nozzle member and provided with a gate face element which is engageable with the valve seat on the nozzle member; and further provided with a stop member; and an actuator lever operatively associated with said gate valve member for bringing the gate face element into and out of engagement with said valve seat wherein the stop member is disposed intermediate the gate face element and the actuator lever; and, wherein the stop member is adapted to engage the outboard end of the nozzle member.

2. The discharge valve apparatus as in claim 1 wherein the intermediate portion of the nozzle member is provided with a pair of handle elements.

3. The discharge valve apparatus as in claim 1 wherein at least one of the support arm elements is operatively connected to said actuator lever.

4. The discharge valve apparatus as in claim 1 further including:

a spring biasing member operatively connected to the nozzle member and one of the support arm members.

* * * * *